March 14, 1939.  R. WARREN  2,150,256
RECORD CONTROLLED STATISTICAL MACHINE
Filed April 6, 1932  9 Sheets-Sheet 1
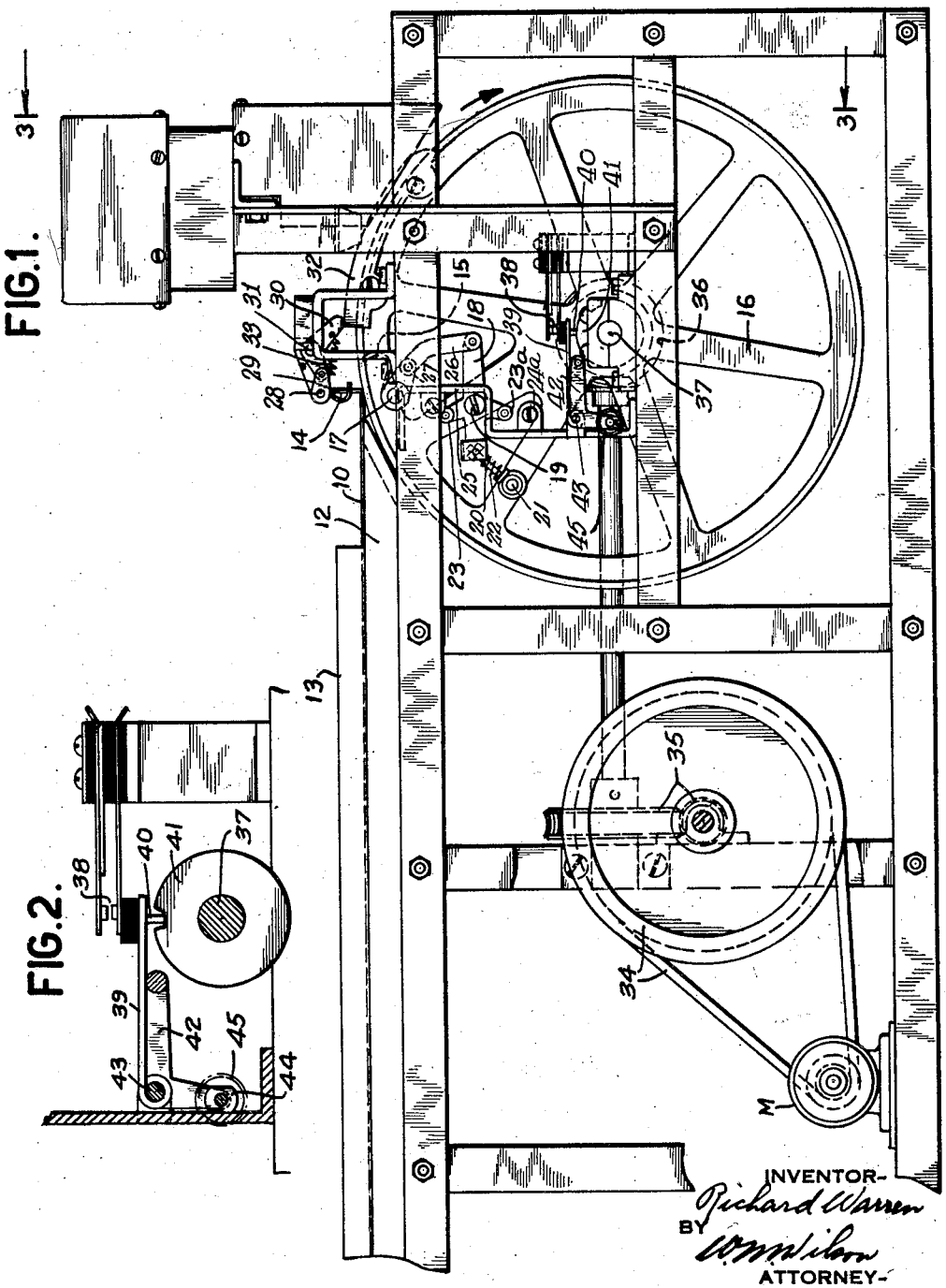
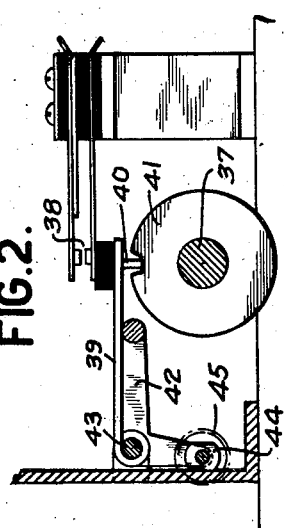
INVENTOR-
Richard Warren
BY
W. M. Wilson
ATTORNEY- March 14, 1939.  R. WARREN  2,150,256
RECORD CONTROLLED STATISTICAL MACHINE
Filed April 6, 1932   9 Sheets-Sheet 2
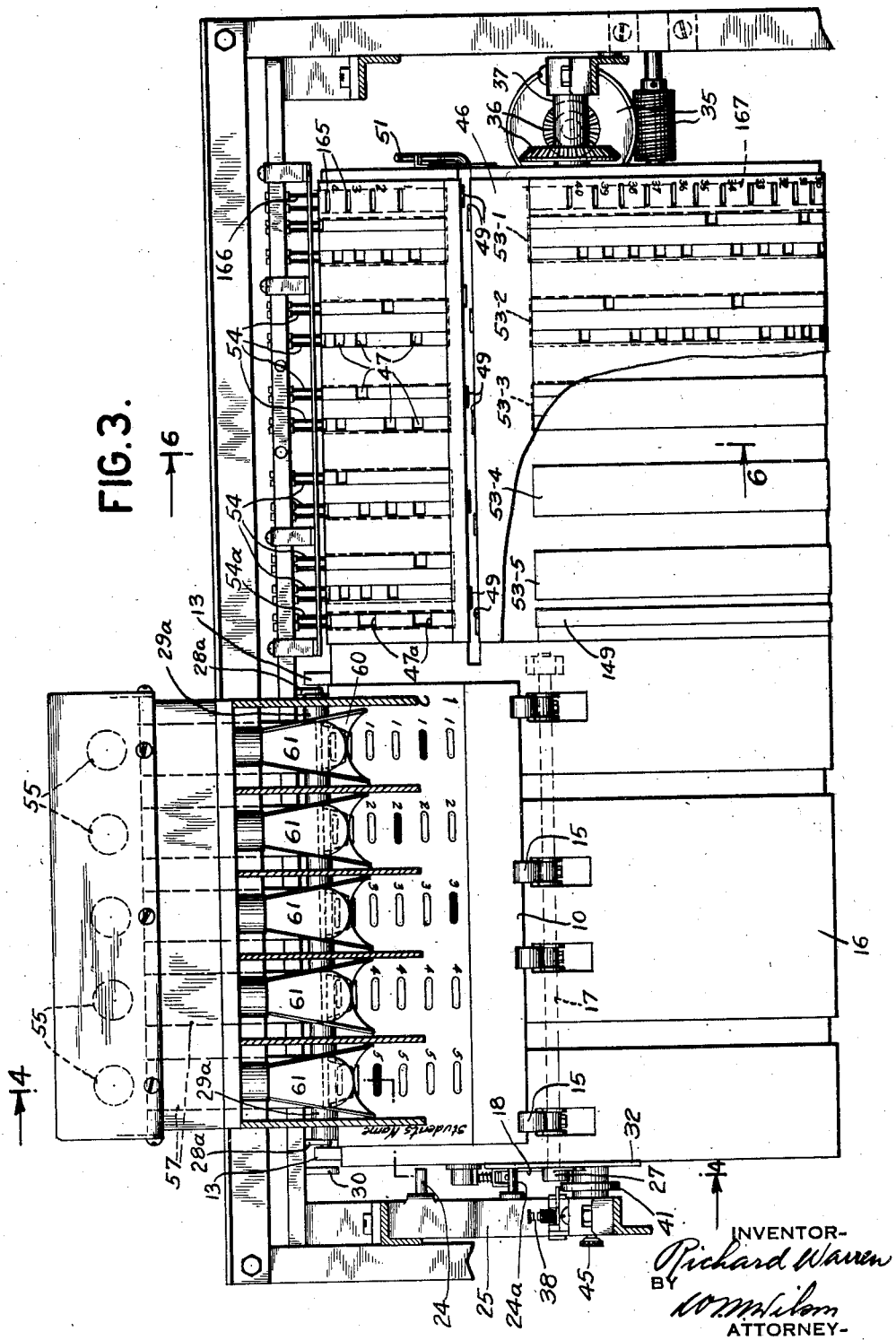

March 14, 1939.    R. WARREN    2,150,256
RECORD CONTROLLED STATISTICAL MACHINE
Filed April 6, 1932    9 Sheets-Sheet 3
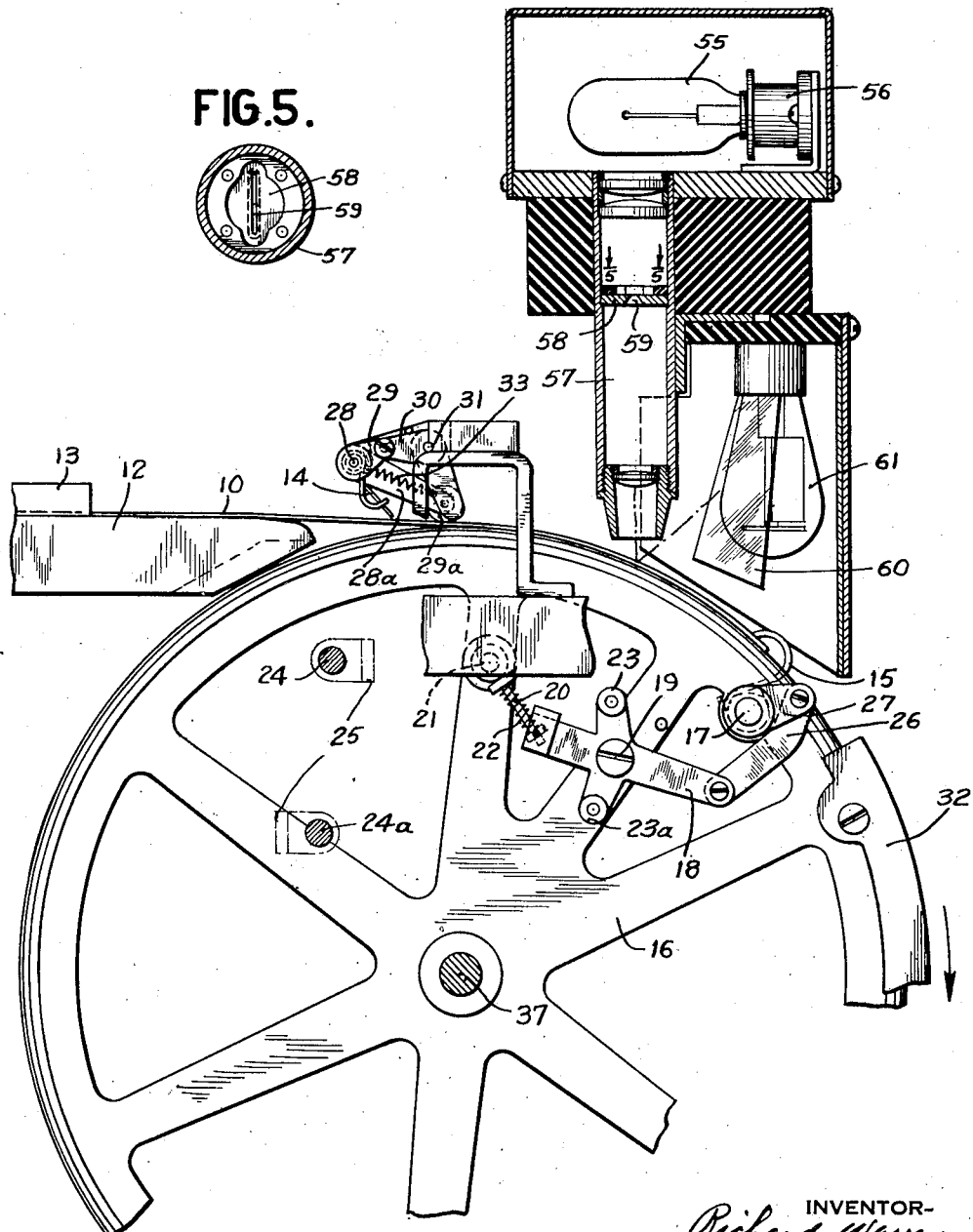

March 14, 1939. R. WARREN 2,150,256
RECORD CONTROLLED STATISTICAL MACHINE
Filed April 6, 1932 9 Sheets-Sheet 4
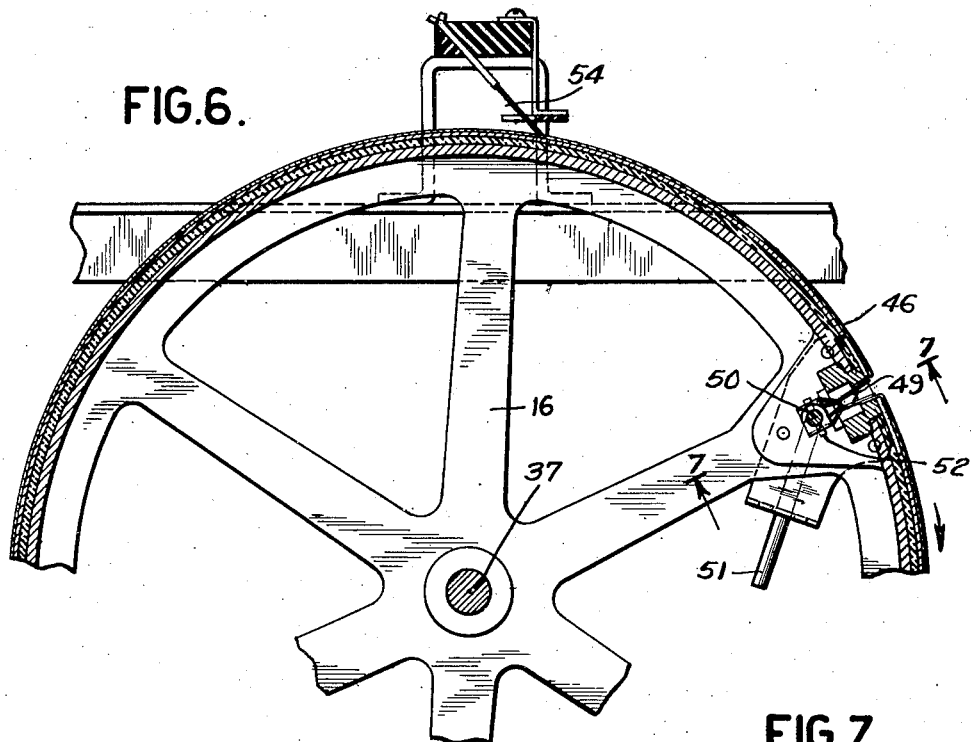
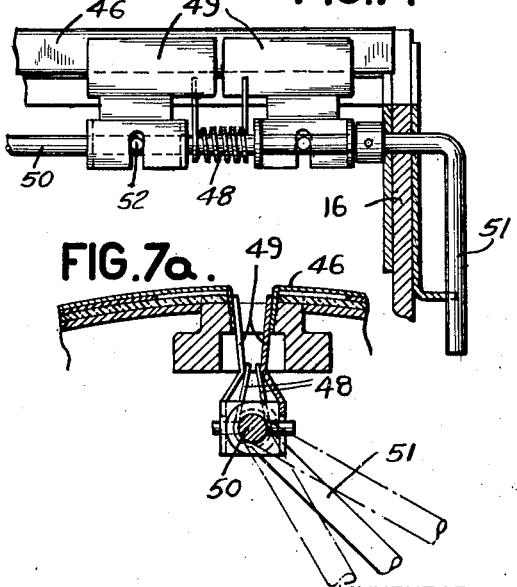
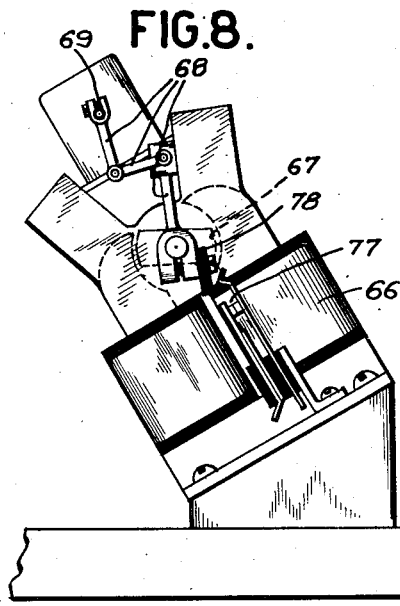
INVENTOR-
Richard Warren
BY
ATTORNEY- March 14, 1939.  R. WARREN  2,150,256
RECORD CONTROLLED STATISTICAL MACHINE
Filed April 6, 1932   9 Sheets-Sheet 5

INVENTOR-
Richard Warren
BY
ATTORNEY-

March 14, 1939. R. WARREN 2,150,256
RECORD CONTROLLED STATISTICAL MACHINE
Filed April 6, 1932 9 Sheets-Sheet 7

INVENTOR-
Richard Warren
BY
ATTORNEY-

March 14, 1939.   R. WARREN   2,150,256
RECORD CONTROLLED STATISTICAL MACHINE
Filed April 6, 1932   9 Sheets-Sheet 9

INVENTOR-
Richard Warren
BY
ATTORNEY-

Patented Mar. 14, 1939

2,150,256

UNITED STATES PATENT OFFICE 2,150,256

RECORD CONTROLLED STATISTICAL MACHINE

Richard Warren, New York, N. Y., assignor, by mesne assignments, to International Business Machines Corporation, New York, N. Y., a corporation of New York Application April 6, 1932, Serial No. 603,499

30 Claims. (Cl. 235—61.7)

This invention relates to a counting apparatus and more particularly to a system for automatically measuring the performance of examinees in response to certain types of examinations. The cost of inspecting and scoring a large number of tests has made it necessary to devise a mechanical answer form for examinations that can rapidly be scored by unskilled clerks. These semi-mechanical tests are in general of the following types: (1) True-false; in which a series of statements is made, any of which may be true or not true. The examinee is directed to mark each of the questions as true or false according to his knowledge of the subject and the number of questions that he marks correctly is his score on the test. (2) Another type of test is the matching test. In this type, two series of facts are given and the examinee is directed to match each fact of one of the series with its related fact in the other. For example, in a given series of events and a given series of different dates, there is one correct date for each event, and if the examinee is well prepared in history, he can assign to each of the events its date. (3) Another type of test is the multiple-choice test, each question of which consists of a statement followed by several possible phrases that could complete the statement. Only one of the phrases is correct in each question and the examinee is required to select the phrase that he believes is correct. The number of questions correctly completed in this way is the examinee's score on the multiple-choice test.

The usual method of expediting the scoring of these tests employs a "key sheet" which is supplied to the scorer and which is suitably arranged in accordance with the location of the answers specified on the examination paper. The "key sheet" consists of a column of numbers in the same spaced relationship as the answers in the original test form and scoring consists in matching or comparing the column of responses with the column of correct numbers on the "key sheet". The scorer counts and records the number of questions that correspond between response and "key" and this number is the examinee's score.

The foregoing tests fall in the general class of choice-response and their scoring can consequently be handled by purely mechanical means. It is desirable to devise some mechanical means to handle them, since, in spite of the simplification of the operations, the work of visually checking large numbers of papers is a tedious and time consuming operation and subject to numerous errors.

The machine as constructed consists principally of two parts, a sensing mechanism for reading the responses of the examinee, and a selecting and recording mechanism for determining the correctness of the response and tallying it accordingly. The examination sheet may be arranged with a plurality of rows of delimited areas in which a mark may be made by means of a pencil or similar instrument. The sheet is then passed through the machine so that each column of delimited areas passes beneath an optical sensing device which successively scans the rows of separate areas. A mark in any particular location will cause the optical system to affect a light sensitive or photo-electric cell which is adapted to operate a relay. Suitable amplifying circuits may be provided or not depending upon the type of cell employed. A "key sheet", perforated in accordance with the correct answers, is fed through the machine concurrently with the examination paper. Electrical contact devices cooperate with the perforations in the "key sheet" and with the photo-electric cell controlled relays to establish a circuit to one counting mechanism if the comparison shows that the answer is correct, and to another counter if the comparison shows that the answer is incorrect. After the examination sheet has been completely passed through the machine, the number of right answers and the number of wrong answers will have been summarized and the result may be noted on the examination paper or elsewhere as indicative of the examinee's rating. The counters may then be restored in preparation for receiving entries under control of the next examination paper.

It is therefore the main object of the invention to construct an automatic record controlled tallying device provided with means for classifying data on record sheets and recording the same in accordance with the result of the classification. It is obviously advantageous to eliminate the human factor in this field of activity since such elimination would save the cost of labor, reduce the possibilities of error, and enable speedier as well as more accurate interpretation of the significance of the comparison between the examination paper and the "key sheet".

A more specific object of the invention is to provide a punching machine which may be controlled by the sensing devices to produce a perforated record of the several responses on the examination paper and which would also receive the result of the responses. This record may be in the form of the well-known Hollerith tabulating card from which various analyses may be made with the aid of tabulating machines.

A further specific object of the invention is to provide mechanism for separately tallying responses for separate groups of questions, as for instance, in cases where it is desired to separately tally the responses to the odd numbered questions and to the even numbered questions. Educational research workers believe that if a given test is a fair measure of a student's ability, the student would make almost the same score if he took the test again. There is no way of proving this directly, however, since the student cannot be given the same test twice under identical conditions of information and attitude but a given test can be divided into two parts and each part regarded as a separate test given at the same time. If the test is a good one, the student's score on each of the two parts should be about the same. This could be done by regarding in a forty question test the questions from 1 to 20 as one test and from 21 to 40 as another test, but it is considered better practice to make the two half tests overlap so that they are, in effect, given at the same time and for this reason the odd-even separation of the score is considered more desirable.

This arrangement calls for the provision of two pairs of counters of which one pair will count wrong answers and right answers for the even numbered questions and the other pair will similarly count the odd numbered questions.

It is possible that an examinee might mark more than one choice for a question. This could result from accident or oversight or it might be due to an examinee's belief that the machine only counted up the number of right answers. If he marked more than one, he would have a better chance of indicating the right one among the several choices and the machine might not take account of his "duplicity" and would credit him with a right answer. It will not do this, but will instead record the double entry as a wrong answer.

It is necessary to provide a "wrong" counter as well as a "right" counter since in some kinds of tests, for example the true-false, it is agreed that omissions of a question will not count against an examinee as much as a definitely wrong answer to the question. In order to obtain a count of the correct answers, the wrong answers, and the omissions, we must have the number of "rights" and the number of "wrongs", the difference between the total number of responses and the total number of questions on the test giving, of course, the number of omissions.

Various other objects and advantages of the invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 1 is an elevational view of the record sheet feeding and analyzing mechanism.

Fig. 2 is a detail at an enlarged scale of parts shown in Fig. 1.

Fig. 3 is an end view of Fig. 1 taken substantially along the lines 3—3 of Fig. 1, showing the record feeding drum and the location of the optical sensing devices and the "key sheet" or comparison record.

Fig. 4 is a sectional view taken substantially along the lines 4—4 of Fig. 3, showing the optical system in sectional detail.

Fig. 5 is a sectional view looking in the direction of the lines 5—5 in Fig. 4.

Fig. 6 is a sectional view of the comparison sheet analyzing device, the section being taken substantially along the line 6—6 of Fig. 3.

Fig. 7 is a detail of the comparison record holding device, the section being taken substantially along the line 7—7 of Fig. 6.

Fig. 7a is a further detail of parts shown in Fig. 6.

Fig. 8 is a detail view of one of the counting devices and the actuating magnet therefor.

Test form

Figure 17:
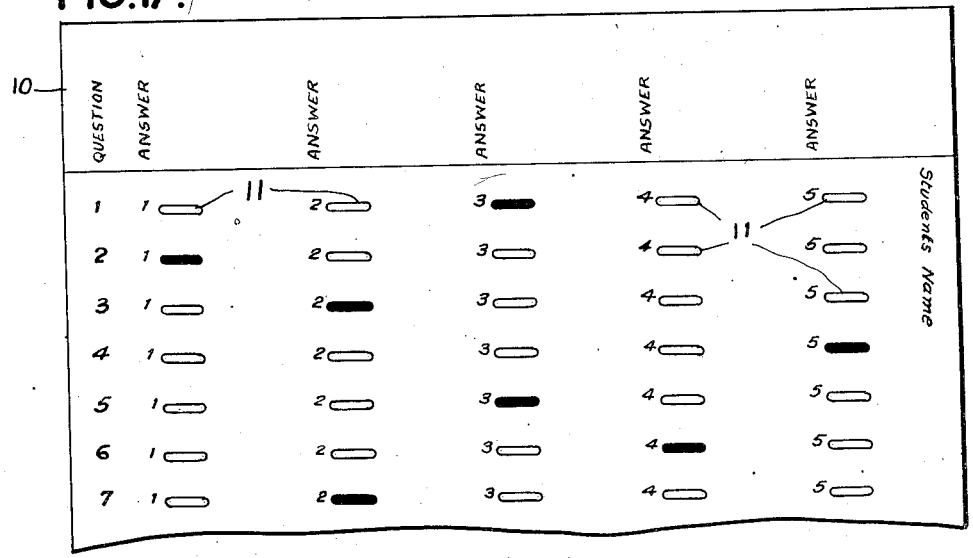
Fig. 17 is a detail of a fragment of an examination paper showing the arrangement of the response areas.

The test form or sheet designated 10 in Fig. 17 is provided with a series of horizontal rows of delimited areas or marking positions designated 11. These areas are also arranged in vertical columns, those in the first column being numbered 1, those in the second column 2, those in the third 3, and so on. Each horizontal row is given a number which corresponds to the number of a particular question which may also, if desired, be printed on the record sheet 10. The several areas in any horizontal row correspond to the several possible answers relating to that question. The examinee is instructed to make a mark in or fill in the delimited area corresponding to the answer which he considers correct for a particular question. Thus, for instance, the blackened area in the third position of the first horizontal line of spaces indicates that the third answer was this particular examinee's choice for the first question. His choice for the second question was answer #1; his choice for the third question was answer #2; his choice for the fourth, answer #5, etc.

Record feeding and analyzing mechanism

The examination or record sheet 10, when ready for correction, is placed upon a table 12 (Figs. 1 and 4) which is provided with suitable lateral guides 13 (see also Fig. 3). The record sheet is placed on the table face upward and its forward edge moved into engagement with pivoted locating fingers 14. A number of clips 15 are pivotally carried by the feeding drum 16 and are mounted on a common operating rod 17 mounted within the drum. With the parts in starting position as shown in Fig. 1 the clips 15 are in their open position, being so held by a resilient toggle connection comprising linkage connected to a member 18 which is pivoted on the drum 16 at 19 and forms a toggle joint with a rod 20 pivoted at 21 on the drum. A spring 22 on rod 20 serves to hold the parts in position. Member 18 is provided with a roller 23 which immediately upon the clockwise movement of drum 16 will strike a pin 24 carried by bracket 25 which is secured to the frame of the machine.

Further movement of drum 16 will rock member 18 in a counterclockwise direction about its pivot through engagement of roller 23 and pin 24, compressing spring 22 and rocking rod 20 from the position of Fig. 1 to that of Fig. 4. The free end of rod 20 is suitably arranged for sliding engagement with the arm of member 18 with which it cooperates. Counterclockwise rocking of member 18 will rock rod 17 in a similar direction through the link 26 and arm 27 so that the clips 15 move into engagement with the record to hold its leading edge firmly against the drum. The fingers 14 are carried by a rod 28 which carries an arm 29 at one extremity thereof. This arm has suitable pin and slot connection with a bell crank 30 pivoted at 31 to a fixed portion of the machine. With the parts in starting position as in Fig. 1, one arm of bell crank 30 rests upon a shoe 32 carried by the drum 16 so that bell crank 30 is held against the action of its spring 33 and fingers 14 assume a vertical position. As drum 16 commences to turn clockwise, bell crank 30 is released by shoe 32 and spring 33 will rock the parts to the position shown in Fig. 4 wherein finger 14 is held out of the path of the record. Rod 28 supports a pair of arms 28a (see also Fig. 3) which carry a roller 29a. This roller rests upon the drum 16 and holds the record sheet 10 thereagainst.

A motor M is provided for driving the drum 16. The connection between the motor and drum comprises belt and pulley 34, worm and worm wheel 35 (see also Fig. 3) and bevel gears 36, one of which is connected to the shaft 37 of drum 16. As the drum rotates the record sheet 10 is drawn in a circular path by clips 15. As the clip mechanism re-approaches its starting position, a second roller 23a engages another pin 24a carried by bracket 25. This engagement causes member 18 to be rocked in a clockwise direction or specifically, from the relative position of Fig. 4 to the position it occupies in Fig. 1. This, of course, releases the record sheet which is then free to fall into any suitable receptacle located in the base of the machine. As the drum approaches its home position the shoe 32 will engage bell crank 30, rocking the related parts back to the position of Fig. 1.

The circuit to motor M which will be hereinafter traced in detail is controlled through a pair of contacts 38, the lower blade of which rests upon an arm 39 (Fig. 2) which is provided with a projection 40 adapted to extend into a slot in the periphery of a disk 41 carried by shaft 37. With the drum 16 in restored position, the relationship of disk 41 and arm 39 is as shown in Fig. 1. A bell crank 42 pivoted at 43 has an extension underlying arm 39 and upon the rocking of bell crank 42 as hereinafter described in a counterclockwise direction arm 39 will be similarly rocked, causing the closure of contacts 38 and disengaging projection 40 from the notch in disk 41. Closure of the starting contacts ST in series with normally closed contacts 38 will complete the circuit to motor M and drum 16 will commence turning. If bell crank 42 is permitted to return to its initial position, contact 38 will open to break the motor circuit toward the end of the cycle of rotation of drum 16 since at such time the notch in disk 41 will have again come into alinement with projection 40. From this point drum 16 will coast to home position as in Fig. 1 again closing contacts 38. In this manner a single revolution of drum 16 may be obtained. One arm of bell crank 42 is provided with a cam member 44 pivoted at the free end thereof. This cam member has connected thereto a knob 45 (see also Fig. 3) which upon ninety degrees of rotation will rock bell crank 42 counterclockwise and hold it in such position until knob 45 is again turned through ninety degrees. This obviously will keep contact 38 closed to maintain motor M continuously energized and consequently provides for continuous rotation of drum 16 and permits the continuous feeding of record sheets 10. These circuits will be traced in detail in connection with the description of the wiring diagram.

*"Key sheet" or comparison record*

A fragment of the "key sheet" or control record is shown at 46 (Fig. 16) and is arranged with several pairs of vertical columns designated 46—1, 46—2, 46—3, 46—4, and 46—5. Perforations 47 are made in these vertical columns and are arranged in horizontal rows having the same spacing as the horizontal rows of the areas 11 on the sheet 10 in Fig. 17. In any horizontal row of the sheet 46 there is provided a perforation for each pair of vertical columns 46—1 to 46—5 in either of the two columns of the pair. These horizontal rows are perforated to indicate the correct answer for the correspondingly numbered question. A perforation in the left hand column of a pair indicates a correct answer while a perforation in the right hand column indicates an incorrect answer. Since for any question there is but one correct answer, it follows that the remaining four possibilities are incorrect so that in any horizontal row of perforations 47 there will be one perforation in one of the left hand columns of the several pairs and there will be a perforation in the right hand column of each of the remaining pairs; for instance, in the horizontal row relating to question No. 1 there is a perforation in the right hand column of pairs 46—1 to 46—4 and a perforation in the left hand column of pairs 46—5 indicating that the fifth possible answer is the correct one for this question No. 1. In question No. 2, the perforation in the left hand column is associated with pair 46—2 indicating that the second possible answer is the correct one for the second question. Similarly, answer No. 3 is indicated as the correct answer for question No. 3.

This "key sheet" is fastened about drum 16 as shown in Figs. 3 and 6, and secured to the drum by inserting the ends thereof into a longitudinal aperture in the drum. The ends of the sheet are held against the opposite sides of the aperture by spring-pressed members 49 mounted upon a rod 50 which is pivoted to the drum as shown in Fig. 7.

Members 49 are adapted to press against opposite sides of the aperture under the influence of springs 48 and to hold the record sheet 46 thereagainst. Rod 50 is provided with a handle 51 which when rocked in a clockwise direction as viewed in Fig. 6 will, through a pin 52, release the members 49 pressing against one side of the aperture, thus freeing the end of the paper against which they bear. Rocking of the handle 51 in the opposite direction will similarly release the oppositely pressing members 49 to free the other end of the sheet. The "key sheet" is thus removable from the drum 16 and it will be understood, of course, that a differently perforated "key sheet" is used for each set of test forms passed through the device.

With the "key sheet" 46 in position on the drum, the pairs of columns 46—1 to 46—5 coincide with strips of conducting material 53—1 to 53—5, respectively, and also cooperate with sets of brushes 54 of which there is a set for each column of perforations. The brushes 54 are so located that they cooperate with the row of perforations relating to a particular question at the same time that the row of delimited areas 11 on sheet 10 relating to the same question is beneath the sensing mechanism at the other side of the drum 16.

Record analyzing mechanism

Figure 11:
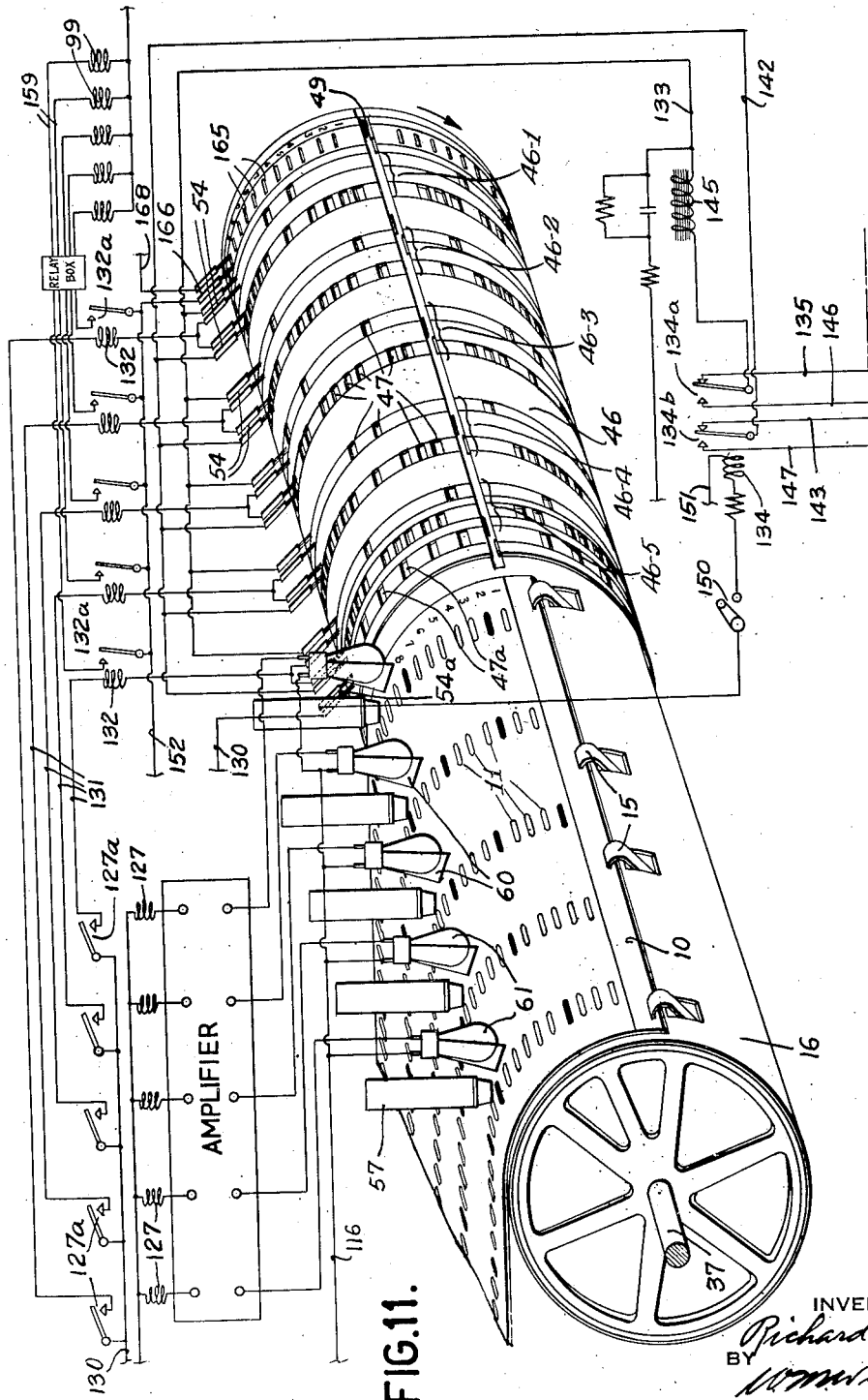
Fig. 11 is a diagrammatic view showing the arrangement of the analyzing and comparing mechanism and circuits.

Referring to Figs. 4 and 11, the optical analyzing system comprises a plurality of incandescent lamps 55 mounted in sockets 56. The image of the lamp filament is projected through a lens system generally designated 57 within which is seated a disk 58 provided with an elongated tapered opening 59 (see also Fig. 5). This opening causes the projection of a beam of light corresponding in outline to one of the delimited areas on the record sheet. This light is reflected from the sheet through a filter 60 to a photoelectric cell 61 of the gas filled type.

Various types of photo-electric cells may be employed, the type known as a caesium cell being considered preferable. This cell is particularly sensitive to red and infra-red light. For this reason the printing on the test form is done with red ink and since all the light that is reflected from the sheet must pass through the filter which is also red, the cells will respond only to the black marks made in the enclosed areas by the examinee and will not respond to the red printing.

Counting mechanism

Figure 9:
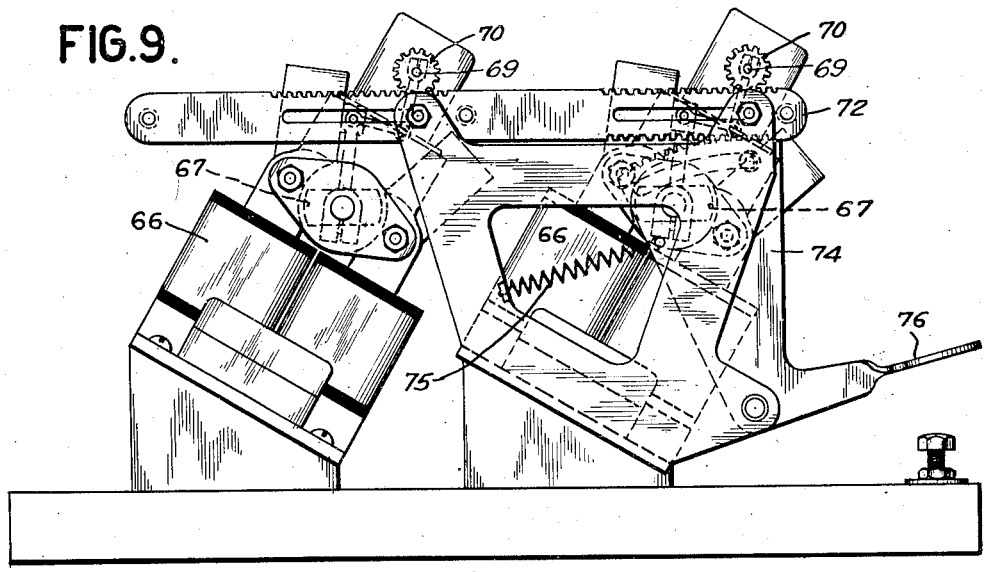
Fig. 9 is a detail of the counters together with the mechanism for restoring the same.
Figure 10:
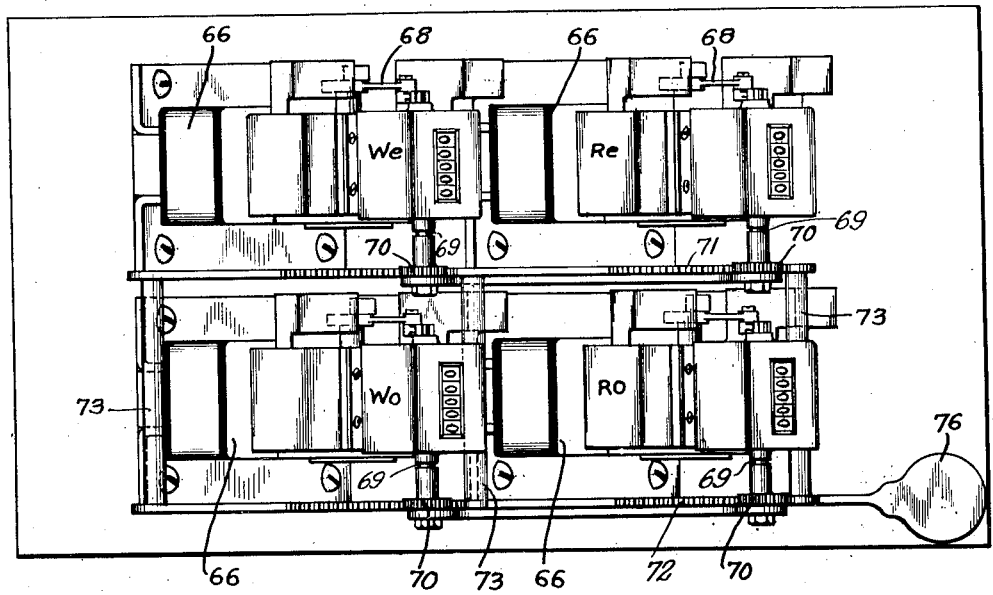
Fig. 10 is a plan view of the counter assembly.

The counters used in connection with this mechanism are of the magnetically operated Veeder type and are shown in Figs. 8, 9, and 10. A set of four counters $W_e$, $W_o$, $R_e$ and $R_o$ are provided, each having an operating magnet 66 which, upon energization, rocks its pivoted armature 67 which, in turn, through links 68 actuates the counter shafts 69 to enter "1" into their respective counters. At the opposite end of each counter a pinion 70 is provided in place of the usual resetting knob common in this type of counting mechanism. A rack 71 meshes with the pinions of counters $W_e$ and $R_e$ and a similar rack 72 meshes with the pinions of counters $W_o$ and $R_o$; these two racks are tied together by cross bars 73. Rack 72 is provided with teeth on its underside meshing with a toothed sector 74 which is held in the position shown in Fig. 9 by a spring 75. The sector is provided with a handle 76 which when depressed will move racks 71 and 72 toward the right as viewed in Fig. 9, causing the counterclockwise rotation of the several pinions 70 which results in the restoration of the counters. Each counter has associated therewith a normally closed contact 77 as shown in Fig. 8. Rocking of armature 67 will cause the link 68 secured thereto to open contact 77 through the medium of a block of insulating material 78.

Punching mechanism

The punching mechanism will now be described. This mechanism is of the type shown in the patent to Lee and Phillips No. 1,772,186, issued August 5, 1930, in which the operation of the punching machine is fully set forth and the present description will therefore be limited to a brief explanation of the punching section sufficient for an understanding of its cooperation with the present machine.

Figure 14:
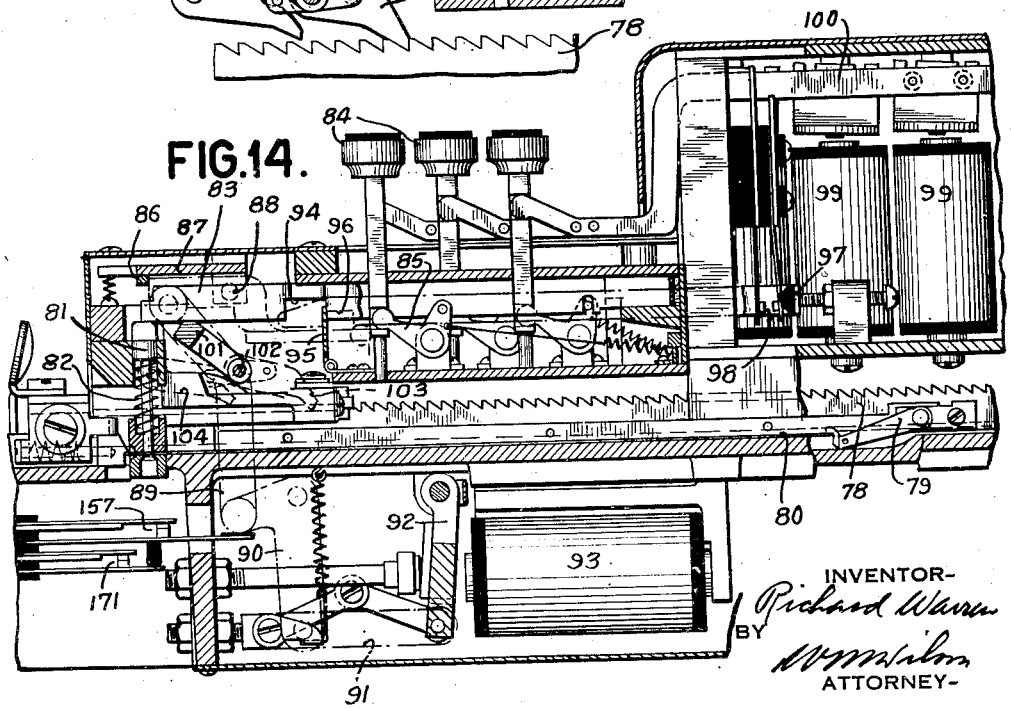
Fig. 14 is a sectional view of the punching mechanism.

The punching mechanism associated with the device is shown in Fig. 14 and comprises a card carriage rack 78 provided with a card pusher 79 which is adapted to move the card to the left step by step as the carriage is escaped. The usual row of punches 81 is disposed above the card and is normally held in raised position by springs 82. Above each punch 81 is disposed an interposer 83 slidably mounted for horizontal movement. Depression of a key 84 will, through bell crank 85, move its associated interposer 83 to the left into position where its upper left hand corner lies under a bar 86. Bar 86 is secured to a bail 87 pivoted at 88 and which through link 89, bell crank 90, and link 91 is connected to the free end of armature 92 of punch magnet 93. Energization of magnet 93 will rock bail 87 in a counterclockwise direction depressing interposer 83 and the punch 81 over which it lies, to force the punch through the record card 80. With the interposer 83 in retracted position as in Fig. 14, rocking of bail 87 will, of course, not effect either the interposer 83 or its associated punch 81. Each interposer 83 is provided with a notch 94 against one side of which rests a pivoted plate 95. A hook member 96 cooperates with plate 95 in such manner that the movement of interposer 83 to the left will cause plate 95 to rock in a counterclockwise direction and draw hook 96 also to the left. The rear end of hook 96 is provided with a lateral extension 97 adapted upon movement of the hook 96 to the left to close a pair of contacts 98. These contacts are wired in series with magnet 93 and upon closure will energize the magnet in a manner to be more fully described in connection with the wiring diagram.

Magnets 99 are provided which upon energization move their associated armatures 100 downwardly. The free ends of these armatures are connected to keys 84 so that energization of a magnet 99 will move its corresponding key downwardly to cause the operation of the related punch 81. Downward movement of any interposer 83 by bar 86 will rock a bail 101 in a counterclockwise direction also rocking a rod 102. Rod 102 (see also Fig. 13) controls the step by step escapement mechanism which comprises the usual holding pawl 103 and the stepping pawl 104. The action is such that rocking of rod 102 in a counterclockwise direction will lower pawl 104 into engagement with a tooth of carriage rack 78 and will raise pawl 103 out of engagement therewith. Restoration of shaft 102 will again raise pawl 104 and permit pawl 103 to move into engagement with the next tooth of the rack thus effecting a spacing operation.

Figure 13:
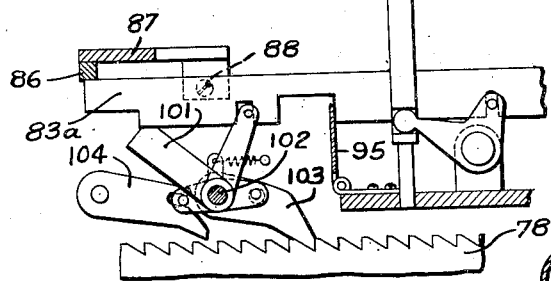
Fig. 13 is a detail of the space key mechanism.

In Fig. 13 an interposer bar 83a is shown. This bar has its forward end normally underlying bar 86 so that rocking of bar 86 at any time will rock bail 101 to effect spacing regardless of whether punching is also effected or not. Bar 83a is associated with space key 84a and had no punch related thereto.

Two pairs of contacts 157 and 171 are so arranged (Fig. 14) that downward movement of link 89 under the influence of magnet 93 will open both the contacts at the end of the downward movement of link 89.

Wiring diagram

Figure 15:
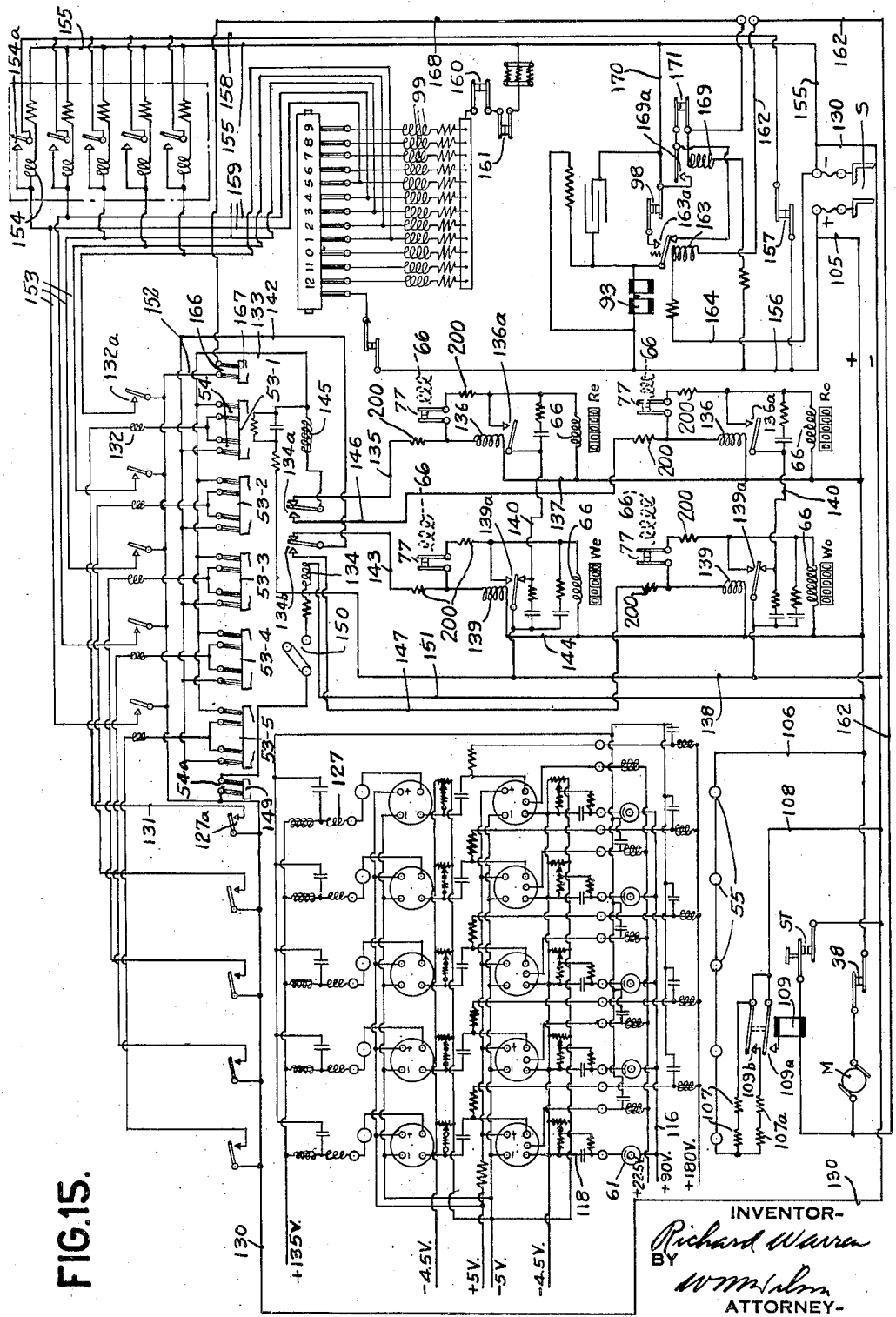
Fig. 15 is a wiring diagram of the electric circuits of the complete device.

The wiring diagram of the entire mechanism is shown in Fig. 15. A source of current supply is indicated at S and a start key at ST. When the machine is connected to the source S, a circuit is immediately completed through the lamps 55 from the left side of the source, through a wire 105, wire 106, lamps 55 and resistances 107, wires 108 and 130, back to right side of source. With this circuit including resistances 107, the lamps will burn at a low brilliance and warm up sufficiently so that they will immediately come to full brightness as soon as the apparatus begins to function.

With the record sheet 10 in starting position, depression of start key ST will complete a circuit from source S, through wire 130, contact ST, relay coil 109, motor M, normally closed contact 38, wire 105, to source S. Relay 109 will close its points 109b to include resistances 107a in the lamp circuit to increase the brilliance of the light. Points 109a upon closure, will set up a holding circuit for motor M from source S, to wire 105, contact 38, motor M, relay coil 109, points 109a, wires 108 and 130 back to source S. The motor will thus remain energized until contact 38 breaks toward the end of the cycle. It will be recalled that contact 38 may be latched in closed position in which case motor M will remain in operation until the contact 38 is released.

Figure 12:
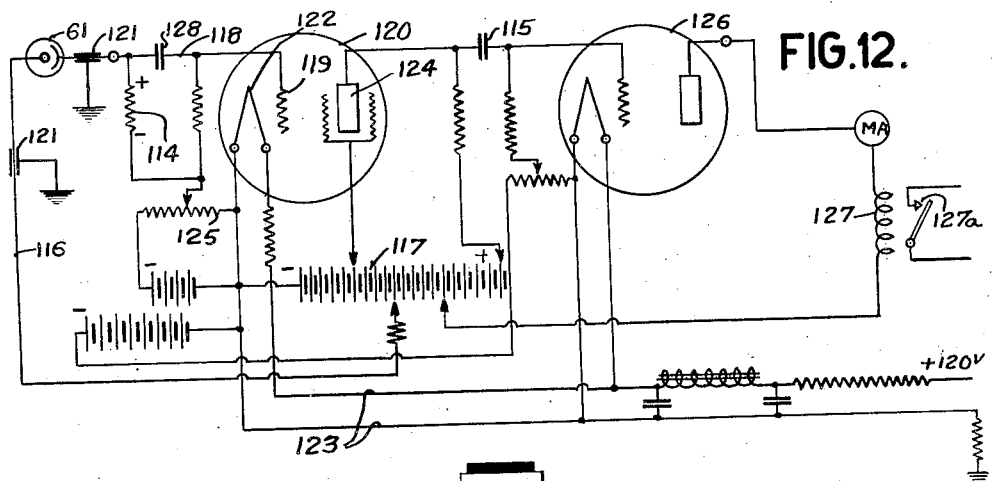
Fig. 12 is a wiring diagram of one of the amplifying circuits.

Each photo-electric cell 61 (see also Fig. 12) is connected by means of a conductor 116 to a battery 117 and through a conductor 118 to the grid 119 of a three-element tube 120. Shields 121 are provided on the cell leads to prevent disturbances due to stray fields.

Tube 120 contains a filament 122 kept hot by wires 123 connected to a source of current and surrounded by the grid 119 through which must pass all of the electrons emitted from the hot filament on their way to the plate 124. The plate is kept at a higher potential than the filament in order to attract these electrons and the potential of the plate varies with the amount of current flowing in the plate circuit. This plate current can be controlled by varying the potential on the grid through which the current electrons must pass. The grid is normally kept at a potential slightly lower than the negative end of the filament, and is adjusted by means of the grid potentiometer 125.

The second tube 126 of the amplifier is a power tube designed to pass a fairly large plate current and has a comparatively low internal resistance. Its purpose is to respond to a signal voltage by releasing a large current through a comparatively low resistance as in relay coil 127.

If the photo-electric cell 61 is connected directly to the grid 119 of the first amplifier tube 120, the potential of the grid will be at every instant the same as the potential of the plate of the photo cell and the plate of the first tube will follow in greatly amplified ratio all of the small changes in the potential of the grid and photo cell. These small changes may be due to variations in the power that lights the filaments of the lamp used as a light source, or to shadows falling on the cell or to a slight difference in the color of two different sheets being analyzed. The first tube 120 amplifies so much that it does not require much change in light flux to produce a very large change in the output voltage of the first tube. In fact, variations in light due to the changes in the lighting power supply that are too small to be observed by the eye will result in a change in the plate output voltage large enough to throw the circuit out of adjustment. For this reason it is necessary to arrange the coupling between the photo cell and the first tube in such a manner that a change in light flux will only have a temporary effect on the system, and that will permit the grid of the tube to go back to its normal operating position without regard to the total light flux that happens to be acting on the cell at that moment. This is done by making the tube respond to the changes in voltage rather than to the total voltage itself. A condenser 128 is introduced between the high voltage end of the photo cell output resistance 114 and the grid 119. The condenser 128 will pass current only during the time that the E. M. F. is changing. After the E. M. F. has changed and has reached a new value, the condenser no longer passes any current, and the potential of the grid returns to its normal position. The arrangement then will respond to changes in light flux but will automatically readjust itself after each change, no matter what the value of the total light reflux is.

While the light is focused on the blank record and reflected from the cell 61, the resistance of the cell is substantially constant, the charge on condenser 128 is likewise substantially constant, and the grid of the vacuum tube 120 is held at a small negative potential by the battery. The value of this negative grid potential is such that it permits the flow of a limited but constant amount of space current. Relay 127 is in the plate circuit of tube 126 whose grid is controlled by the plate current from plate 124 through condenser 115 and will therefore be in its open position. When a pencil mark cuts off the light momentarily, the resistance of cell 61 becomes greater and the charge on the condenser 128 is changed, resulting in a flow of current through the grid resistance, thereby increasing the negative potential of the grid sufficient to reduce the flow of space current through the tube 120. This changes the charge on condenser 115 and consequently on the grid of tube 126 which causes the energization of relay 127. Relay 127 thereupon closes its points 127a.

Closure of points 127a (Fig. 15) will establish a circuit from source S, wire 130, points 127a, wire 131, relay coil 132 to the two central brushes 54 of the set of brushes cooperating with the pair of columns on the comparison record 46 associated with the column of the answer sheet 10 controlling coil 127 (see also Fig. 11). From here the circuit will branch to the left or right to one of the outer brushes 54 of a set through metallic strip 53—1 to 53—5 depending upon whether there is a perforation 47 in the left or right column of pairs 46—1 to 46—5. It will be understood, of course, that brushes 54 sense these perforations 47 concurrently with the analysis by the photo-electric apparatus of the corresponding response rows of marked areas 11. Specifically, if there is a mark in the fifth column of sheet 10 and there is a perforation in the right column 46—5 (as viewed in Fig. 11) of the same question the circuit will continue from the right one of central brushes 54 of column 5 through perforation 47, contact strip 53—5, next adjacent brush 54 to the "right" wire 133, choke coil 145, relay points 134a, wire 135, relay coil 136, wire 137, wire 105, back to source S.

Energization of coil 136 will cause closure of its points 136a to effect a circuit as follows: from source S, wire 130, wire 138, lower relay points 139a, wire 140, points 136a, magnet 66 of the upper "right" counter R_e and wire 137 to source S. A parallel circuit runs from points 136a to contacts 77, coil 136, wires 137 and 105, to source S, thus setting up a holding circuit for relay coil 136. Energization of magnet 66 will cause "one" to be added to its associated counter R_e.

With the perforation 47 in the left column of pairs 46—5 (as viewed in Fig. 11) the circuit from the left central brush 54 will continue through such perforation to the strip 53—5 to the next adjacent brush 54 on the left and thence through wire 142 to relay points 134b, wire 143, relay coil 139, wires 144 and 105 to source S. Consequent closure of upper points 139a provides a circuit from source S, wire 130, wire 138, upper points 139a, contacts 77, coil 139, wire 144, wire 105, back to source S, and a parallel circuit from upper points 139a, magnet 66 of the upper left counter W_e, wires 144 and 105 to source S.

It will be noted that the two upper counters W_e and R_e are controllable from any set of brushes 54, counter R_e being actuated if there is a perforation in any right hand column 46—1 to 46—5 and counter W_e being actuated if there is a perforation in any left hand column. The circuit to counter R_e must pass through the lower relay points 139a which are controlled by the circuits of counter W_e so that as long as relay 139 is deenergized, the circuit for counter R_e may be established. When more than one relay 127 is energized, due to the marking of more than one enclosed area in any row of the record sheet, the tendency will then be to energize coils 136 and 139 simultaneously but a choke coil 145 in wire 133 leading to coil 136 will cause the circuit therethrough to lag, permitting the more rapid circuit to relay 139 to effect opening of lower relay points 139a and prevent completion of the other circuit. In this manner, a double response to any question on the examination paper will be recorded as a "wrong" answer even though one of the responses may be a correct one. Energization of magnet 66 will cause opening of associated contacts 77 to drop the holding circuits of the relays 136 and 139. Resistances 200 are provided, one of which is in series with relay 136 in the pickup circuit of this relay. The other is included in the holding circuit of magnet 136 traced through contacts 77. These resistances 200 are of such value that the initial circuit through wire 135 is effective only through the relay 136.

Below counters W_e and R_e are counters W_o and R_o upon which may be tallied the odd numbered responses. The circuits to these counters are similar to those for counters W_e and R_e; extending from wires 133 and 142, through the left hand points 134a and 134b of relay 134 and wires 146 and 147 which correspond to wires 135 and 143 respectively. From here the circuits are identical with those already described and will therefore not be repeated. Similar parts are given similar reference characters.

Figure 16:
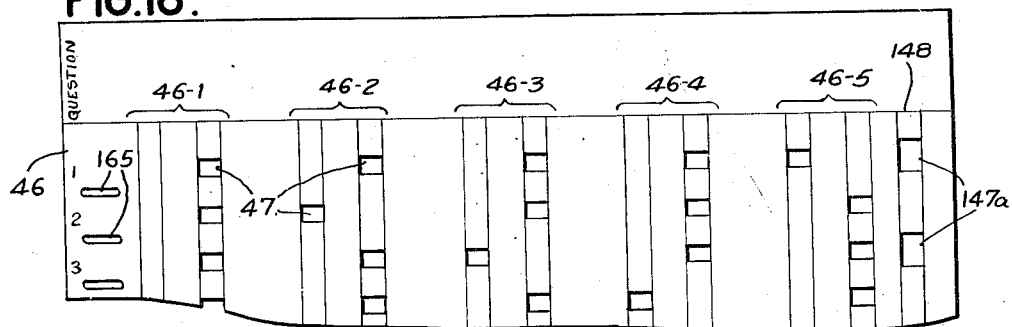
Fig. 16 is a detail of a fragment of the "key sheet" or comparison record.

Relay 134 is controlled by a pair of brushes 54a which traverse a column of the comparison record 46 designated 148 in Fig. 16. In this column perforations 147a are made in the horizontal row positions representing the odd numbered responses. Slightly before the response to each odd numbered question is analyzed and identified as "right" or "wrong" by the comparison record, a circuit is completed from source S, wire 130, brushes 54a, perforation 47a, metal strip 149 (see Fig. 3) switch 150 (now closed), relay 134, wires 151 and 105 to source S. Energization of relay 134 shifts its armature to open points 134a, 134b on the right and close its points to the left thereby shifting entry from counters W_e, R_e to counters W_o, R_o. This separate tallying of odd and even responses may be incapacitated by opening switch 150 in which case only the upper counters are used. It is quite obvious that perforations 147a may be so located that entries may be made into counters W_o, R_o from any other positions of the record 10, than those shown in connection with the particular application under consideration.

As mentioned above, a relay 132 is included in each wire 131 leading to central brushes 54. The points 132a of each relay are connected to a common wire 152 which connects to source S through wire 130. Closure of a point 132a will continue the circuit through a wire 153, relay coil 154, wire 155 to source S, energizing the relay 154 and causing closure of its points 154a. This sets up a holding circuit running from source S, wire 156, contact 157 (normally closed) wire 158, relay points 154a, relay 154, wire 155 back to source S. This circuit will remain established until opening of contacts 157 by the action of punch magnet 93.

A further circuit may now be traced from source S, wire 156, contact 157, wire 158, points 154a, wire 159 to the appropriate interposer magnet 99, normally closed contacts 160, 161, wire 155, back to source S. Energization of magnet 99 will thereupon move its interposer forward into cooperation with its punch.

During record sheet analysis, while motor M is in operation, a circuit may be traced as follows: from source S, wire 105, contacts 38, motor M, wire 162, relay 163, wire 164 to source S. This circuit is completed as long as motor M remains energized thus keeping points 163a in the position shown on the circuit diagram. This opens the circuit between punch magnet 93 and contact 98, preventing the operation of the punch under key control while motor M is operating.

Key sheet 46 (Fig. 16) has a column of perforations 165, one for each horizontal row of perforations 47 and located so as to cooperate with brushes 166 (Figs. 3, 11 and 15) shortly after brushes 54 sense perforations 47. At this time a circuit is established from source S to wire 130, wire 152, one of the brushes 166, hole 165, conductor strip 167, other brush 166, wire 168, relay 169, wire 156 to source S. Relay 169 closes its points 169a and current will flow from source S, wire 155, wire 170, points 169a, contact 171, relay 169, to source S through wire 156. This is the holding circuit for the relay which is broken upon opening of contacts 171 by the action of punch magnet 93. The punch magnet circuit is now completed from source S, wires 155, 170, points 169a, lower points 163a, punch magnet 93, wire 156, back to source S. Punching thereupon takes place in the positions in which interposer magnets 99 have been energized.

Where no response is made for a particular question and consequently no counter actuation takes place; punch magnet 93 will nevertheless be energized to cause spacing without punch operation. The card will thus show by a blank column that the question to which it corresponds has not been answered.

*Recapitulation*

In order that the complete operation of the machine may be better understood, a résumé of the entire sequence of operations as performed by the machine will now be given in connection with the application of the device to the scoring of examination papers and the reproduction of the examinee's responses in perforated card form.

Figure 18:
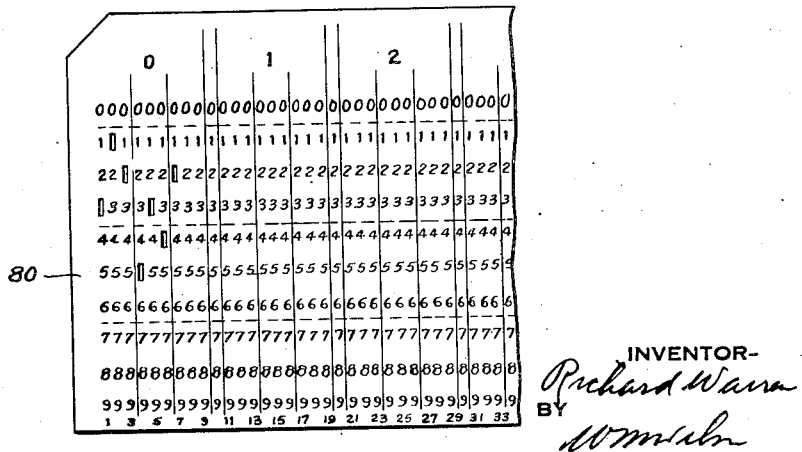
Fig. 18 is a fragmentary detail of a record card perforated in accordance with the fragmentary examination paper in Fig. 17.

After the examination paper has been placed on the table 12 and its leading edge moved into engagement with the locating fingers 14, start key ST is depressed which will complete the motor circuit and drum 16 will commence to rotate. As the first row of response areas 11 of the examination sheet arrives beneath the lenses 57 and the first row of perforations 47 arrives at the sensing positions 54, circuits will be completed under control of the photo-electric cells 61 in accordance with the manner in which the examinee has recorded his response to the first question. If he has made a mark in the area related to the correct answer, the circuits will be completed in the manner outlined in detail above to add "1" in the counter which accumulates the number of correct answers. At the same time a branch circuit will be completed to the punch magnet corresponding to the answer selected by the examinee. This will cause the perforation of the record card 80 of Fig. 18 in the first column thereof and in the index point position corresponding to the selected answer.

If the examinee's response is noted in one of the areas other than that corresponding to the correct answer, the circuits will be controlled to enter a "1" in the counter which accumulates the number of "wrong" answers. The circuits will also effect the perforation of the record card in the index point position corresponding to the selected answer. It will thus be noted that a mark made in any delimited area 11 of a row of such areas may either cause the entry of "1" into the "wrong" counter or into the "right" counter in accordance with the configuration of the comparison sheet 46. The control of the punch, however, in either case, will be such as to perforate the corresponding position in the column of the record card regardless of the significance of the mark itself.

Where there is more than one perforation in a horizontal row, a single entry of "1" is made in the "wrong" counter. The punching device, however, will take account of each separate mark and perforate the corresponding column of the record card in each position for which a mark has been made. Where a horizontal row is left blank, the counters will, of course, remain inoperative and the punching mechanism will be operated to space one step. The speed of rotation of the drum 16 is timed so that as each row of areas 11 passes the optical device the step-by-step escapement mechanism of the punch will be operated so that as, let us say, the twentieth row of response areas is being analyzed by the optical system, the twentieth column of the record card is in position to receive perforations therein. After the examination sheet 10 has been completely analyzed, the score as tallied by the counters may be noted thereon or, if desired, this result may be manually perforated on the record card 80 by means of the keys 84 of the punching mechanism. The counters are then reset and this card 80 may be replaced by a new card and a new examination paper placed in position.

If it is desired to separately tally the odd and even questions, the switch 150 of Fig. 15 is closed and the "right" and "wrong" answers of the odd questions will be tallied separately from the "right" and "wrong" answers of the even questions. The operation of the punching mechanism will, however, take place regardless of the distribution of the results.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention.

What is claimed is:

1. In a machine of the class described, means for analyzing an examination response sheet for marks representative by their location on the sheet of right and wrong answers, counting devices controlled by said analyzing means and means including a second sheet and sensing means therefor for determining, in accordance with their location the significance of the marks analyzed and for causing the operation of the counting devices in accordance with said determined significance.

2. In a machine of the class described, means for analyzing predetermined areas of a record for marks therein, each mark having in accordance with the location of the area in which it is made, one of a number of significances, means including a second record and sensing means therefor for determining the significance of each mark analyzed, and means including a plurality of counters controlled by said analyzing and determining means for separately counting the marks having the same significance.

3. In a machine of the class described, light-sensitive means for analyzing a record sheet for indicia marked thereon, a plurality of counters and means including a pattern sheet and analyzing means therefor, cooperating with said first named analyzing means for selectively associating one of said counters with said first named analyzing means for control thereby.

4. In a machine of the class described, a record sheet having perforations, light-sensitive means for analyzing a record sheet with indicia marked thereon, a counter controlled by said analyzing means to count said indicia, means for analyzing said first named record sheet and means controlled by said last named analyzing means for preventing the operation of said counter under control of said first named analyzing means.

5. In a machine of the class described, means for optically analyzing a record having indicia marked thereon and arranged in columns, a counter controlled by said analyzing means for counting marks in said columns, means cooperating with said analyzing means for rendering said counter ineffective to count marks in certain positions in the columns of the record and means for pre-selecting said certain positions.

6. In a machine for tallying responses to an examination, means for analyzing a response sheet having variously located positions in which markings are adapted to be made, a comparison sheet having correspondingly located positions in which perforations are made indicative of correct and incorrect answers, means for analyzing said comparison sheet concurrently with the analysis of said response sheet, a counter for counting correct answers and means jointly controlled by both of said analyzing means to control said counter to count the markings on the response sheet corresponding to positions on the comparison sheet punched to indicate correct answers only.

7. In combination, means for analyzing a record sheet having indicia marked thereon, said means including a light source, light-sensitive means actuated by the light source, a plurality of circuits completed by said light-sensitive means; a plurality of counters, one for each circuit and record controlled means for selecting one of said circuits to control the related counter.

8. In a machine of the class described, means for analyzing a response sheet having a plurality of marking positions in one of which a mark may be made to designate a selected answer, means for concurrently analyzing a comparison sheet having a pair of marking positions for each marking position of the response sheet, one of said pairs of marking positions containing a mark indicating a correct answer and each of the other pairs being marked to indicate incorrect answers, a counter for correct answers, a counter for incorrect answers, operating means for each counter, means jointly controlled by said analyzing means, when the pair of marking positions on the comparison sheet corresponding to the position marked on the response sheet are marked to indicate a correct answer, for causing the operating means of the correct answer counter to operate said counter, and means jointly controlled by said analyzing means, when the pair of marking positions on the comparison sheet corresponding to the position marked on the response sheet are marked to indicate an incorrect answer, for causing the operating means of the incorrect answer counter to operate said counter.

9. In a machine of the class described, means for analyzing a response sheet having a plurality of marking positions in one of which a mark may be made to designate a selected answer, means for analyzing a comparison sheet having a pair of marking positions for each marking position of the response sheet, one of said pairs of marking positions containing a mark indicating a correct answer and each of the other pairs being marked to indicate incorrect answers, a counter for correct answers, a counter for incorrect answers, operating means for each counter, means jointly controlled by said analyzing means, when the pair of marking positions on the comparison sheet corresponding to the position marked on the response sheet are marked to indicate a correct answer, for causing the operating means of the correct answer counter to operate said counter, and means jointly controlled by said analyzing means, when the pair of marking positions on the comparison sheet corresponding to the position marked on the response sheet are marked to indicate an incorrect answer, for causing the operating means of the incorrect answer counter to operate said counter.

10. In a machine of the class described, means for analyzing a response sheet having a plurality of marking positions in one of which a mark may be made to designate a selected answer, means for analyzing a comparison sheet having a pair of marking positions for each marking position of the response sheet, one of said pairs of marking positions containing a mark indicating a correct answer and each of the other pairs being marked to indicate incorrect answers, a counter for correct answers, a counter for incorrect answers, a circuit, including a magnet, completed by said analyzing means jointly when the pair of marking positions on the comparison sheet corresponding to the position marked on the response sheet are marked to indicate a correct answer, means controlled by said magnet for causing operation of the counter for correct answers, a second circuit, including a second magnet, completed by said analyzing means jointly when the pair of marking positions on the comparison sheet corresponding to the position marked on the response sheet are marked to indicate an incorrect answer, and means controlled by said second magnet for causing operation of the counter for incorrect answers.

11. In a machine of the class described, means for concurrently analyzing a plurality of marking positions on a response sheet, in one of which a mark may be made to designate a selected answer, means for analyzing a comparison sheet having a column of marking positions for each marking position of the response sheet, one of said columns having a mark positioned to designate a correct answer and the others each having a differently positioned mark to designate incorrect answers, a counter for correct answers, a counter for incorrect answers, an operating magnet for each counter, normally open operating circuit connections for each magnet, means controlled by said analyzing means jointly when the mark on the response sheet is made in the position corresponding to the column on the comparison sheet marked to indicate the correct answer, for completing the circuit connections to the magnet associated with the correct answer counter, and means controlled by said analyzing means jointly, when a mark on the response sheet is made in any other position for completing the circuit connections to the magnet associated with the incorrect answer counter.

12. In a machine of the class described, means for concurrently analyzing a plurality of marking positions on a response sheet, in one of which a mark may be made to designate a selected answer, a plurality of main circuit connections, one for each marking position, a pair of parallel branch connections extending from each main connection, a common return connection for one of each pair of branch connections, a second common return connection for the other of each pair of branch connections, a "correct answer" counter, an operating control magnet therefor included in one return connection, an "incorrect answer" counter, an operating control magnet therefor included in the other return connection, means including correct answer selecting means for electrically connecting a branch of one of said main connections to the return connections related to the "correct answer" counter, means including incorrect answer selecting means for connecting the other branch of each of the other pairs of branches to the return connection related to the "incorrect answer" counter, a source of current connected on one side to said return connections, and means controlled by said analyzing means for connecting the main circuit connection corresponding to the position containing a mark to said source of current whereby a circuit will be completed through one of the branches of said main connection and its return connection depending upon which is connected by the aforesaid correct and incorrect answer selecting means.

13. The invention set forth in claim 12 in which the correct and incorrect answer selecting means comprise a record sheet having perforations through which the electrical connections are made.

14. In a machine of the class described, means for sensing a succession of rows of marking positions of a response sheet, one by one, means for concurrently sensing a corresponding succession of rows of marking positions of a comparison sheet, a pair of counters, means normally controlled by the first sensing means and a part of the second sensing means for controlling the operation of said counters in accordance with the arrangement of marks in the pair of rows concurrently sensed, a second pair of counters and means controlled by another part of said second sensing means upon sensing a special mark in the pair of rows concurrently sensed for preventing control of said first pair of counters and causing the second pair of counters to be controlled by the rows being sensed.

15. In a machine of the class described, means for sensing, in succession, a plurality of rows of marking positions on a response sheet, in each row of which a mark may be made to designate a selected response to a question, two pairs of counters, one counter of each pair for counting "correct" responses and the other counter of each pair for counting "incorrect" responses, settable devices adjusted in accordance with the correct and incorrect answers for each row of the response sheet, adjusting means therefor, means controlled by said sensing means and said settable devices for causing operation of the counters in accordance with the correctness or incorrectness of the responses, selectively adjustable means and control means therefor for causing one pair of counters to be controlled to count the responses in the odd numbered rows of the sheet and the other pair to be controlled to count the responses in the even numbered rows of the sheet whereby a separate count is obtained of the number of correct and incorrect responses for the odd and even numbered questions.

16. In a machine of the class described, means for sensing, in succession, a plurality of rows of marking positions on a response sheet, in each row of which a mark may be made to designate a selected response to a question, two pairs of counters, one counter of each pair for counting "correct" responses, and the other counter of each pair for counting "incorrect" responses, settable devices adjusted in accordance with the correct and incorrect answers for each row of the response sheet, adjusting means therefor, means controlled by said sensing means and said settable devices for causing operation of the counters in accordance with the correctness or incorrectness of the responses, selectively adjustable means and control means therefor for causing one pair of counters to be controlled to count the responses in certain selected rows of the sheet and the other pair to be controlled to count the responses in the remaining rows of the sheet.

17. In a machine of the class described, means for sensing in succession a plurality of rows of marking positions on a response sheet, in each row of which a mark may be made to designate a selected response to a question, two counters, settable devices adjusted in accordance with the correct answers for each row of the response sheet, adjusting means therefor, means controlled by said sensing means and said settable devices for causing operation of said counters when the selected response is the correct answer, selectively adjustable means and control means therefor for causing one counter to be controlled to count the correct responses in the odd numbered rows of the sheet and the other counter to count the correct responses in the even numbered rows of the sheet.

18. In a machine of the class described, means for sensing, in succession, a plurality of rows of marking positions on a response sheet, in each row of which a mark may be made to designate a selected response to a question, two counters, settable devices adjusted in accordance with the correct answers for each row of the response sheet, adjusting means therefor, means controlled by said sensing means and said settable devices for causing operation of said counters when the selected response is the correct answer, selectively adjustable means and control means therefor for causing one counter to be controlled to count the correct responses in certain selected rows of the sheet and the other counter to count the correct responses in the remaining rows of the sheet.

19. The invention set forth in claim 18 in which the selectively adjustable means is an electrical switching device and the control means therefor is a record controlled circuit closer arranged to operate the switching device during the sensing of the said certain selected rows on the response sheet.

20. In a machine of the class described, means for analyzing a response sheet having a row of marking positions in one of which a mark may be made to designate a selected response, a counting device, a plurality of switching devices equal in number to the plurality of said marking positions, means for causing operation of one of said devices to represent a correct answer, a circuit including a magnet, completed by said analyzing means and the operated switching device when the position marked on the sheet corresponds to the switching device operated and means controlled by said magnet for operating said counting device.

21. In a machine of the class described, means for analyzing a response sheet having a row of marking positions in one of which a mark may be made to designate a selected response, a plurality of switching devices, one for each marking position, means for causing operation of one of said devices to represent a correct answer and a circuit including electrically responsive means completed by said analyzing means and the operated switching device when the position marked on the sheet corresponds to the switching device operated.

22. In a machine of the class described, means for analyzing a response sheet having a row of marking positions in one of which a mark may be made to designate a selected response, a plurality of switching devices, one for each marking position, means for causing adjustment of one of said devices to represent a correct answer and the other devices to represent an incorrect answer, a circuit including electrically responsive means completed by said analyzing means and the device adjusted for a correct answer when the position marked on the sheet corresponds to the device so adjusted, and a second circuit including a second electrically responsive means completed by said analyzing means and any of the other devices adjusted for an incorrect answer when the position marked on the sheet corresponds to one of said other devices.

23. The invention set forth in claim 22 in which a counter is provided for each circuit, each controlled by the electrically responsive means of its related circuit and means operative when both circuits are concurrently completed in response to a mark in a "correct answer" position and a second mark in an "incorrect answer" position for preventing the control of the counter related to the circuit completed in response to the "correct answer" mark.

24. In a machine of the class described, means for analyzing a response sheet having a row of delimited areas in one or more of which a mark may be made, means for analyzing a comparison sheet having a "correct answer" position for each area and an "incorrect answer" position for each area, one of said "correct answer" positions being marked and all but the corresponding "incorrect answer" position also marked, a "correct answer" counter, an "incorrect answer" counter, means jointly controlled by both said analyzing means when a single area is marked on the response sheet and corresponds to the "correct" position marked on the comparison sheet for controlling the operation of the "correct answer" counter, means jointly controlled by both said analyzing means when a single area is marked on the response sheet and corresponds to one of the "incorrect" positions marked on the comparison sheet for controlling the operation of the "incorrect answer" counter and further means controlled by said last named means when the response sheet contains a mark in both an area corresponding to a "correct" answer and an "incorrect answer" for preventing the operation of the "correct answer" counter.

25. A test scoring machine for examination sheets having designations selectively placed thereon and according to the position placed representing answers to questions, comprising a base; feeding means for moving an examination sheet relatively to the base past a given point; sheet scanning means carried by the base, responding to the designations on said sheets; an accumulator; and means for operating said accumulator from the responses of the sheet scanning means to correct answer designations, to total the score of answers on the sheet.

26. A test scoring machine for examination sheets having designations selectively placed thereon and according to the position placed representing correct and incorrect answers to questions, comprising a correct-answer accumulator; means for operating said accumulator according to the correct-answer designations on said sheets, including sheet scanning means responding to said designations; means for feeding sheets relatively to the scanning means; and means for preventing operation of said accumulator when designations representing both a correct answer and an incorrect answer to any one question are scanned by the scanning means.

27. A test scoring machine for examination sheets having designations selectively placed thereon and according to the position placed representing correct and incorrect answers to questions, comprising a correct-answer accumulator; an incorrect-answer accumulator; means for operating said accumulators selectively according to the correct-answer and incorrect-answer designations on the sheets, including sheet scanning means responding to said designations; means for feeding the sheets relatively to the scanning means; and means for preventing operation of the correct-answer accumulator when designations, representing both an incorrect answer and a correct answer to any one question, are scanned by the scanning means.

28. A test scoring machine for examination sheets having designations selectively placed thereon and according to the position placed representing correct and incorrect answers to questions, comprising a score-totalizing device; means for operating said device selectively according to the correct-answer and incorrect-answer designations on the sheets, including sheet scanning means responding to said designations; means for feeding the sheets relatively to the scanning means; and means for preventing correct-answer operation of the device when an incorrect-answer designation is scanned by the scanning means.

29. In a test scoring machine through which examination sheets are passed having designations selectively placed thereon and according to the position placed representing answers to questions, a cylindrical member adapted to turn with advancement of the sheets; a master pattern carried by said member and arranged to correspond to the designations of a correctly answered examination sheet; and means on said member for engaging an examination sheet to position successive portions of the latter properly relatively to said pattern as the member turns and the sheet advances through the machine.

30. The invention as defined in claim 29, in which the pattern comprises a removable sheet secured to the cylindrical member in predetermined relation to the means for engaging the examination sheets.

RICHARD WARREN.